United States Patent
Masaoka et al.

[11] Patent Number: 5,772,171
[45] Date of Patent: Jun. 30, 1998

[54] ADJUSTABLE SUPPORT STAND

[76] Inventors: Ralph T. Masaoka; Mary Anne Rougeux, both of 861 Erie Cir., Milpitas, Calif. 95035

[21] Appl. No.: 631,695

[22] Filed: Apr. 9, 1996

[51] Int. Cl.$^6$ ........................................ A47K 1/00
[52] U.S. Cl. .................. 248/397; 248/27.8; 248/220.31
[58] Field of Search .................... 248/397, 371, 248/393, 395, 220.31, 133, 136, 447, 448, 449, 450, 454, 455, 457, 176.1, 309.1, 309.2, 27.8

[56] References Cited

U.S. PATENT DOCUMENTS

| | | | |
|---|---|---|---|
| 1,188,452 | 6/1916 | Johnson | 248/220.31 |
| 2,100,421 | 11/1937 | Wupper | 248/220.31 |
| 2,147,800 | 2/1939 | Sadowski . | |
| 2,621,807 | 12/1952 | Renich | 248/220.31 X |
| 3,058,706 | 10/1962 | Snell | 248/27.8 |
| 4,045,206 | 8/1977 | Hewitt, Jr. | 156/91 |
| 4,629,100 | 12/1986 | Owens | 223/46 |
| 4,989,486 | 2/1991 | Quinn | 260/54.5 |
| 4,998,703 | 3/1991 | Stewart | 248/447 |
| 5,255,421 | 10/1993 | Kamysiak | 29/243.56 |

*Primary Examiner*—Leslie A. Braun
*Assistant Examiner*—Anita M. King
*Attorney, Agent, or Firm*—Bruce H. Johnsonbaugh

[57] ABSTRACT

An adjustable support stand is provided for use in assembling wreaths and floral arrangements utilizing a base and an upper member connected to the base by a pair of hinges and adjustment rods. The upper member moves between a closed position where it lays against the base member and an open position wherein it forms an obtuse angle with the base member. In its open position, the upper member supports a wreath during the assembly process by the use of removable pegs inserted in perforations in the surface of the upper member.

4 Claims, 3 Drawing Sheets

ADJUSTABLE SUPPORT STAND

BACKGROUND AND BRIEF SUMMARY OF THE INVENTION

The present invention relates generally to an adjustable support stand. More particularly, the present invention provides an adjustable support stand for use in assembling wreaths and floral arrangements. The present invention allows a person who is assembling a wreath or floral arrangements to repeatedly step back from the wreath or floral arrangement during the assembly process to view or inspect the workpiece as it is assembled. The ability to view the workpiece is particularly important when assembling rather ornate wreaths or floral arrangements.

The prior art does teach various mechanisms for use in assembling wreaths and a variety of general purpose workstands. For example, the Kamysiak U.S. Pat. No. 5,255,421 dated Oct. 26, 1993 teaches a pedal actuated mechanism working together with three jaws to clamp the greens and wrap wire around them. This patent does not teach or suggest any type of support system to hold a partially assembled wreath or floral arrangement during the assembly process to allow repeated viewing or inspection. The Sadowski U.S. Pat. No. 2,147,800 dated Feb. 21, 1939 teaches a work holder for use by tool makers and craftsmen. The device utilizes pegboard and clamps. No suggestion is made of using the device for wreaths and the mechanism of the device does not lend itself for use in assembling wreaths or floral arrangements. The Rendich U.S. Pat. No. 2,621,807 dated Dec. 16, 1952 teaches a pegboard-type advertising display which is simply a flat supporting plate. The Quinn U.S. Pat. No. 4,989,846 dated Feb. 5, 1991 teaches another flat supporting tray with apertures for holding casserole dishes. Neither Rendich nor Quinn teaches an upright member and neither teaches or suggests the use of a holder for partially assembled wreaths or floral arrangements. The Hewitt U.S. Pat. No. 4,045,266 dated Aug. 30, 1977 teaches a system for forming an upright picture frame usinag pegs and rubber bands, but does not suggest use of the device for creating wreaths or floral arrangements.

A primary object of the present invention is to provide an adjustable support stand capable of supporting wreaths and floral arrangements during assembly thereof, wherein the user may periodically step back and view or inspect the workpiece.

Another object of the invention is to provide a collapsible support stand for wreaths and floral arrangements which may be folded into a compact closed position in which it is readily transportable.

Another object of the invention is to provide an adjustable support stand for ornate wreaths wherein the user may readily make changes in the aesthetic design of the wreath during the assembly process.

Other objects and advantages of the invention will become apparent from the following description and drawings wherein:

DETAILED DESCRIPTION OF THE DRAWINGS

Figure 1:
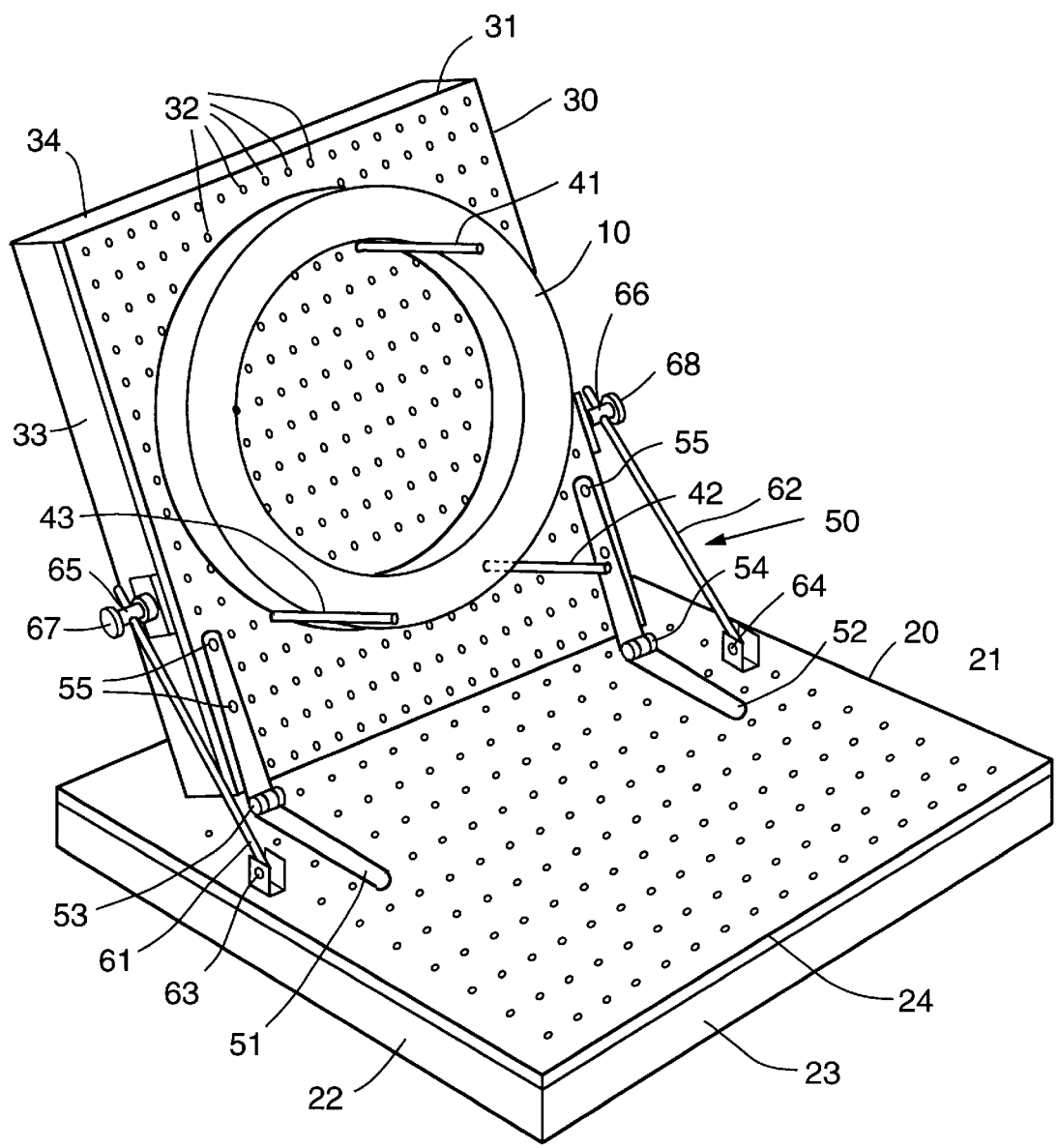
FIG. 1 is a perspective view of the present invention shown in its open position.

As shown in FIG. 1, a base 20 is provided which is generally rectangular as shown and which has a plurality of perforations 21 in its surface. Base 20 may be ordinary pegboard or it may be made of molded plastic or even metal. Side rails 22 and 23 support the perforated base 20.

An upper member 30 is carried by the base 20 and is movable between an open position shown in FIG. 1 and a closed position in which the top 31 of upper member 30 is rotated downwardly and contacts the edge 24 of base 20. Upper member 30 has a plurality of perforations 32 and may be constructed of pegboard, molded plastic or perforated metal. Side rails 33 and 34 support the perforated pegboard or other material which forms the upper member 30.

A circular disc 10 is shown in FIG. 1 and schematically represents a wreath or other floral arrangement. The present invention is particularly useful in assembling somewhat ornate wreaths and other floral arrangements capable of being supported and suspended on upper member 30 by pegs such as 41, 42 and 43 shown in FIG. 1. A plurality of pegs are used to support the wreath as it is assembled. The pegs are readily inserted into and removed from perforations 32. Pegs may also be inserted into the perforations 21 in base 20 to provide lateral support for some wreaths or floral arrangements.

Figure 2:
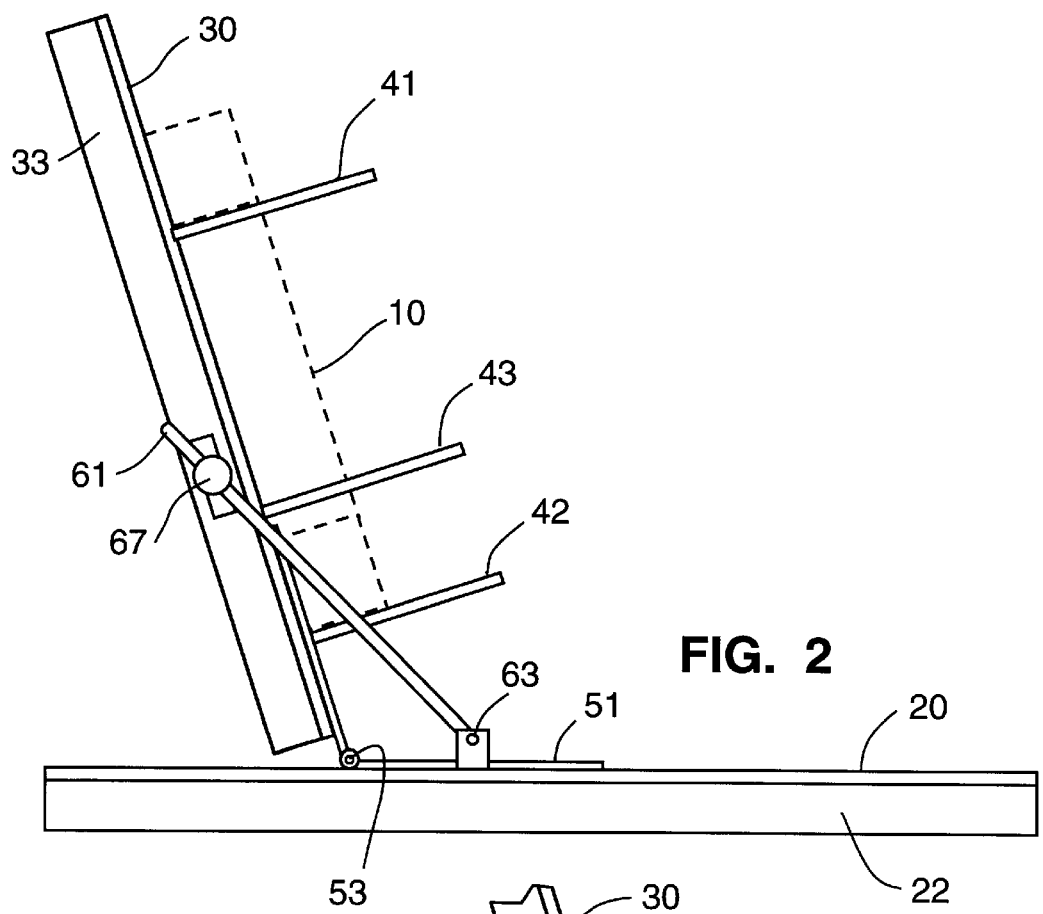
FIG. 2 a side elevational view of the apparatus of FIG. 1.

Connecting means referred to generally as 50 in FIG. 1 includes first and second hinges 51 and 52, respectively, having pivot pins 53 and 54, respectively. Hinges 51 and 52 are mounted on base 20 and connected to upper member 30 by fasteners 55. Hinges 51 and 52 move between a closed position in which upper member 30 is parallel with and adjacent to the base 20 and to an open position wherein the upper member forms an obtuse angle with the base as shown best in FIGS. 2–4. The angle formed between the upper member and the base is preferably in the range of 110° to 120°.

Adjustment rods 61 and 62 are provided which allow the user to adjust the angle at which the upper member 30 sits relative to base 20. Adjustment rods 61 and 62 are pivotally connected to base 20 by pins 63 and 64, respectively. Rods 61 and 62 slide into guides 65 and 66 carried by upper member 30. Thumb screws 67 and 68 are used to secure adjustment rods 61 and 62 in any desired position, which secures upper member 30 in arty selected angular position relative to base 20. When upper member 30 is rotated to its closed position, thumb screws 67 and 68 are tightened to hold upper member 30 parallel to and adjacent with base member 20.

It is within the scope of this invention to replace the pivot pins 53 and 54 in hinges 51 and 52 with removable pins such as cotter pins so that upper member 30 may be readily and completely detached from base member 20.

Figure 3:
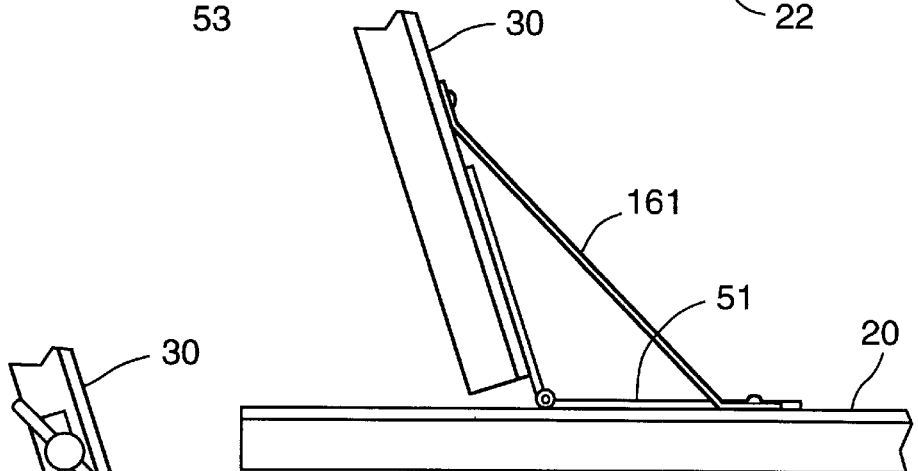
FIG. 3 is a side elevational view of an alternate embodiment of the invention.
Figure 4:
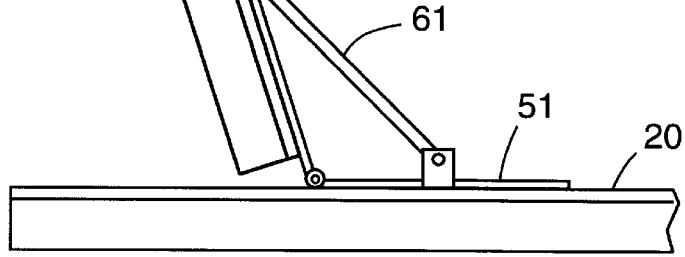
FIG. 4 is a side elevational view of the invention.
Figure 5:
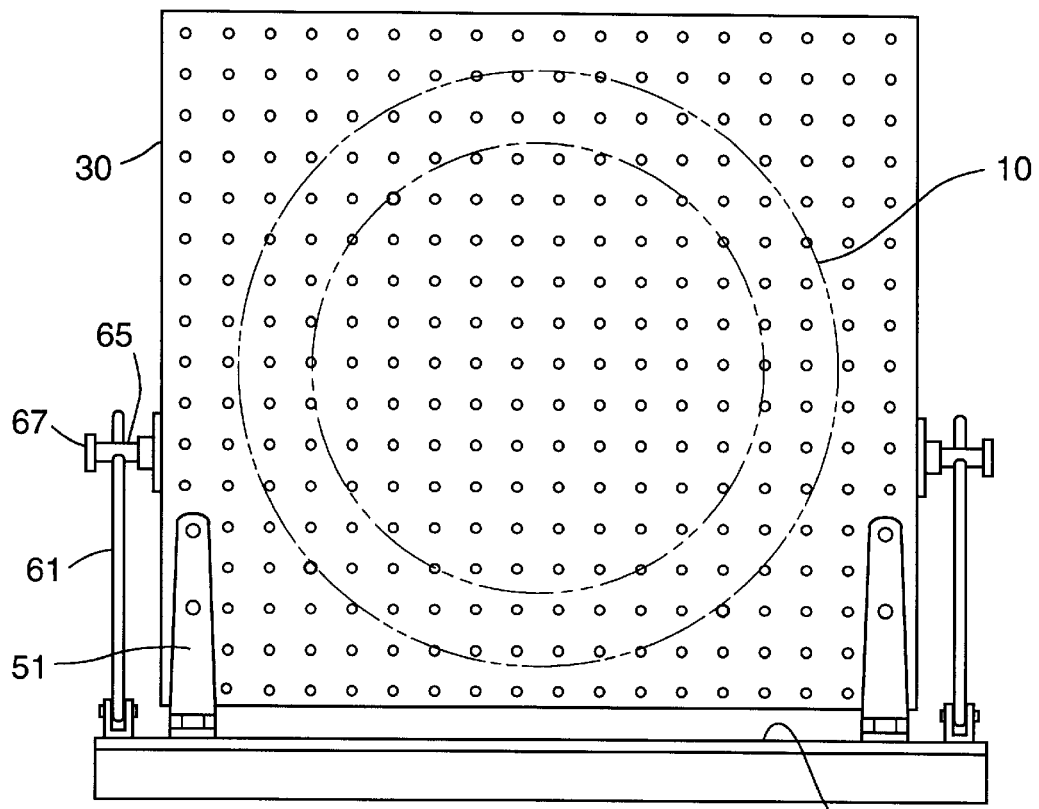
FIG. 5 a front elevational view of the invention.

FIG. 3 shows an alternate form of the invention in which the adjustment rods 61 and 62 are not utilized and in their place one or more flexible straps 161 are utilized in conjunction with one or more hinges 51. The flexible strap 161 can be made of leather, rope or other flexible but relatively strong material.

Figure 6:
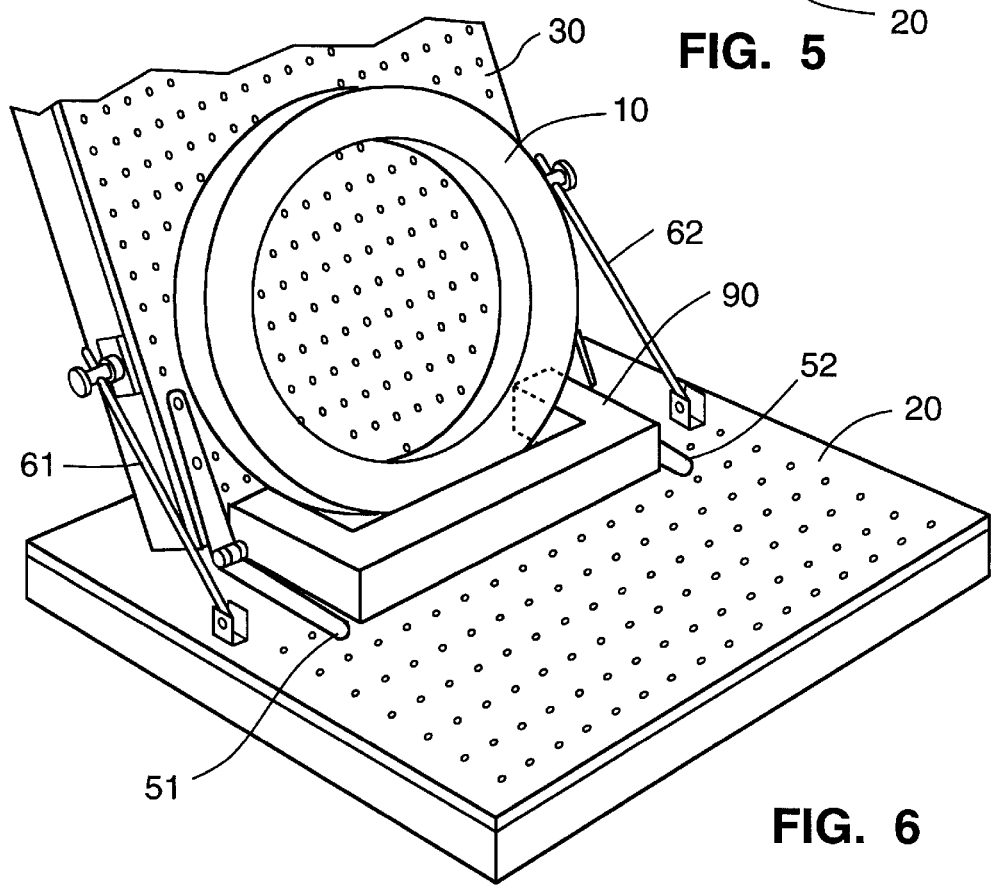
FIG. 6 is a perspective view of an alternate form of the invention.

FIG. 6 shows yet another variation of the present invention in which a U-shaped support 90 is mounted on base member 20 between hinges 51 and 52 and provides additional support for the base of wreath 10.

It is to be understood that the invention may be utilized with only one adjustment rod and it is also possible to utilize the invention with only a single hinge but the apparatus is much more stable using two adjustment rods and two hinges. Similarly, the flexible strap can be used either as a single strap 161 or a pair of straps replacing the adjustment rods 61 and 62.

What is claimed is:

1. An adjustable support stand for use in assembling wreaths and floral arrangements, said support stand having a closed position and an open position, comprising:

a base, an upper member carried by said base, said upper member having a plurality of perforations, first and second hinges mounted on said base and connected to said upper member whereby said upper member may be moved between said closed and said open positions, in said closed position said upper member is generally parallel with and adjacent to said base, and in said open position said upper member forms an obtuse angle with said base, first and second adjustment means pivotally connected to said base, first and second guides carried by said upper member, locking means carried by said first and second guides, and a plurality of pegs readily insertable into and removable from said perforations in said upper member, whereby a wreath or floral arrangement may be supported by said pegs to allow said wreath or floral arrangement to be inspected one or more times during assembly thereof.

2. The support stand of claim 1 wherein each said hinge has a removable pin as its pivot.

3. The support stand of claim 1 further comprising a U-shaped support carried on said base between said first and second hinges.

4. An adjustable support stand for use in assembling wreaths and floral arrangements, said support stand having a closed position and an open position, comprising:

a base, an upper member carried by said base, said upper member having a plurality of perforations, hinge means attached to said base and said upper member whereby said upper member may be moved between said closed and said open positions, in said closed position said upper member is generally parallel with and adjacent to said base, and in said open position said upper member forms an obtuse angle with said base, means for holding said upper, member in its open position relative to said base member, a plurality of pegs readily insertable into and removable from said perforations in said upper member, whereby a wreath or floral arrangement may be supported by said pegs to allow said wreath or floral arrangement to be inspected one or more times during assembly thereof, and a generally U-shaped support means carried by said base.

* * * * *